US012452629B2

(12) United States Patent
Hofmann et al.

(10) Patent No.: US 12,452,629 B2
(45) Date of Patent: Oct. 21, 2025

(54) APPARATUS FOR DETERMINING USER POSITION

(71) Applicant: Fraunhofer-Gesellschaft zur Förderung der angewandten Forschung e.V., Munich (DE)

(72) Inventors: Alexander Hofmann, Erlangen (DE); Mohammad Alawieh, Erlangen (DE); Leszek Raschkowski, Berlin (DE); Sebastian Kram, Erlangen (DE); Birendra Ghimire, Erlangen (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 348 days.

(21) Appl. No.: 17/738,298

(22) Filed: May 6, 2022

(65) Prior Publication Data

US 2022/0264257 A1    Aug. 18, 2022

Related U.S. Application Data

(63) Continuation of application No. PCT/EP2020/081076, filed on Nov. 5, 2020.

(30) Foreign Application Priority Data

Nov. 14, 2019 (EP) .................................. 19209250

(51) Int. Cl.
*H04W 4/029* (2018.01)
*G01S 5/00* (2006.01)
*H04W 84/06* (2009.01)

(52) U.S. Cl.
CPC ........... *H04W 4/029* (2018.02); *G01S 5/0072* (2013.01); *G01S 5/009* (2013.01); *H04W 84/06* (2013.01)

(58) Field of Classification Search
CPC ..... H04W 4/029; H04W 84/06; H04W 64/00; G01S 5/0072; G01S 5/009; G01S 1/042;
(Continued)

(56) References Cited

U.S. PATENT DOCUMENTS

| 2007/0021121 A1* | 1/2007 | Lane ................... H04W 56/006 455/67.16 |
| 2007/0021122 A1* | 1/2007 | Lane ................. H04W 56/0025 455/67.16 |

(Continued)

OTHER PUBLICATIONS

Lee Kyuman et al, "Hybrid Positioning Scheme Based on Satellite and Aeronautical Relay for the Battlefield", 2014 IEEE Military Communications Conference, IEEE, (Oct. 6, 2014), doi:10.1109/MILCOM.2014.95, pp. 531-536, XP032686525 [X] 1-23 the whole document DOI: http://dx.doi.org/10.1109/MILCOM.2014.95.

(Continued)

*Primary Examiner* — Kenneth T Lam
(74) *Attorney, Agent, or Firm* — NKL LAW; Jae Youn Kim

(57) ABSTRACT

An apparatus for determining a position of a user device, UE, in a wireless communication system, the wireless communication system comprising one or more of moving transmission reception points, TRPs, wherein the apparatus is configured to: initiate one or more procedures to perform one or more measurements between the UE and the moving TRP, and to obtain one or more measurement results; and receive at least one message from the moving TRP comprising a position information of the moving TRP; wherein the apparatus is capable to estimate the position of the UE using the measurement result and the position of the moving TRP.

19 Claims, 15 Drawing Sheets

(58) Field of Classification Search
CPC ........ G01S 5/0009; G01S 5/0036; G01S 5/02; G01S 5/0249; G01S 13/765; G01S 19/00; G01S 19/38

See application file for complete search history.

(56) References Cited

U.S. PATENT DOCUMENTS

| | | | | |
|---|---|---|---|---|
| 2013/0084884 | A1* | 4/2013 | Teyeb | H04W 48/04 |
| | | | | 455/456.1 |
| 2015/0002334 | A1* | 1/2015 | Lim | G01S 5/10 |
| | | | | 342/357.47 |
| 2020/0182959 | A1* | 6/2020 | Markhovsky | G01S 19/05 |
| 2020/0296680 | A1* | 9/2020 | Akkarakaran | G01S 5/0263 |
| 2021/0119746 | A1* | 4/2021 | Manolakos | G01S 5/10 |
| 2021/0345061 | A1* | 11/2021 | Moon | H04W 56/0045 |
| 2021/0345215 | A1* | 11/2021 | Sun | H04B 7/2041 |

OTHER PUBLICATIONS

Orange, Alcatel "Introducing A-GNSS in UTRAN", 3GPP Draft; R2-061192_CR25305_V5, 3rd Generation Partnership Project (3GPP), Mobile Competence Centre ; 650, Route Des Lucioles F-06921 Sophia-Antipolis Cedex, May 4, 2020, France, vol. RAN WG2, No. XP050131142 [X] 1-23 the whole document, May 8-12, 2006, Shanghai, China.

3GPP TS 38.455 V15.2.1, "3rd Generation Partnership Project;Technical Specification Group Radio Access Network; NG-RAN; NR Positioning Protocol A (NRPPa) (Release 15)", Jan. 2019.

3GPP TS 36.455, V15.2.1, "3rd Generation Partnership Project; Technical Specification Group Radio Access Network; Evolved Universal Terrestrial Radio Access (E-UTRA); LTE Positioning Protocol A (LPPa) (Release 15)", Jan. 2019.

3GPP TS 38.305 V15.4.0, "3rd Generation Partnership Project; Technical Specification Group Radio Access Network; NG Radio Access Network (NG-RAN); Stage 2 functional specification of User Equipment (UE) positioning in NG-RAN (Release 15)", Jun. 2019.

3GPP TS 36.305 V15.1.0, "3rd Generation Partnership Project;Technical Specification Group Radio Access Network; Evolved Universal Terrestrial Radio Access Network (E-UTRAN); Stage 2 functional specification of User Equipment (UE) positioning in E-UTRAN (Release 15)", Sep. 2018.

3GPP TR 38.811 V15.1.0, "3rd Generation Partnership Project; Technical Specification Group Radio Access Network; Study on New Radio (NR) to support non-terrestrial networks (Release 15)", Jun. 2019.

3GPP TR 38.821 V0.7.0, "3rd Generation Partnership Project; Technical Specification Group Radio Access Network; Solutions for NR to support non-terrestrial networks (NTN) (Release 16)", May 2019.

3GPP TS 36.355 V15.5.0, "3rd Generation Partnership Project; Technical Specification Group Radio Access Network; Evolved Universal Terrestrial Radio Access (E-UTRA); LTE Positioning Protocol (LPP) (Release 15)", Sep. 2019.

3GPP TS 38.473 V15.7.0, "3rd Generation Partnership Project;Technical Specification Group Radio Access Network; NG-RAN; F1 application protocol (F1AP) (Release 15)", Sep. 2019.

H. Stewart Cobb, "GPS Pseudolites: Theory, Design, and Applications", A Dissertation submitted to the Department of Aeronautics and Astronauts and the Committee on Graduate Studies of Stanford University, Sep. 1997, XP 55433812A.

* cited by examiner

| IE/group name | presence | range | IE type and reference | semantics description |
|---|---|---|---|---|
| serving cell ID | M | | ECGI 9.2.6 | E-UTRAN cell identifier of the serving cell |
| serving cell TAC | M | | OCTET STRING(2) | tracking area code of the serving cell |
| E-UTRAN access point position | O | | 9.2.8 | the configured estimated geographical position of the antenna of the cell |
| measured results | M | 0..<maxnoMeas> | | |
| >CHOICE *measured results value* | M | | | |
| >>value angle of arrival | M | | INTEGER (0..719) | according to mapping in TS 36.133 [8] |
| >>value timing advance type 1 | M | | INTEGER (0..7690) | according to mapping in TS 36.133 [8] |
| >>value timing advance type 2 | M | | INTEGER (0..7690) | according to mapping in TS 36.133 [8] |
| >>result RSRP | | 1..<maxCellReport> | | |
| >>>PCI | M | | INTEGER (0..503, ...) | physical cell identifier of the reported cell |
| >>>EARFCN | M | | INTEGER (0..65535, ..., 65536..262143) | corresponds to NDL for FDD and NDL/UL for TDD in ref. TS 36.104 [5] |
| >>>ECGI | O | | ECGI 9.2.6 | E-UTRAN cell global identifier of the reported cell |
| >>>value RSRP | M | | INTEGER (0..97, ...) | |
| >>result RSRQ | | 1..<maxCellReport> | | |
| >>>PCI | M | | INTEGER (0..503, ...) | physical cell identifier of the reported cell |
| >>>EARFCN | M | | INTEGER (0..65535, ..., 65536..262143) | corresponds to NDL for FDD and NDL/UL for TDD in ref. TS 36.104 [5] |
| >>>ECGI | O | | ECGI 9.2.6 | E-UTRAN cell global identifier of the reported cell |
| >>>value RSRQ | M | | INTEGER (0..34, ...) | |

Fig. 5

| IE/group name | presence | range | IE type and reference | semantics description |
|---|---|---|---|---|
| ... | ... | | | ... |
| access point position | | | | |
| NR access point position | optional | | 9.2.8 | the configured estimated geographical position of the antenna of the cell or TRP (transmission reception point) |
| NR access point position quality | optional | 0....99 | | quality of the NR access point position |
| NR access point position source | GNSS, IMU, trajectory | | | source of the NR access point position |
| time of the position measurement | optional | SFN/HyperSFN or UTC | | the access point position at time (X) |
| position time record | optional | 0...<maxnoPos> | | [NR access point position, NR access point position time] |
| measured results | | 0....<maxnoMeas> | | |
| ... | | | | |

Fig. 14

APPARATUS FOR DETERMINING USER POSITION

CROSS-REFERENCE TO RELATED APPLICATIONS

This application is a continuation of copending International Application No. PCT/EP2020/081076, filed Nov. 5, 2020, which is incorporated herein by reference in its entirety, and additionally claims priority from European Application No. EP 19209250.0, filed Nov. 14, 2019, which is also incorporated herein by reference in its entirety.

The present invention relates to the field of wireless communication systems or networks, more specifically to an apparatus for determining a position of a user device in a wireless communication system, a wireless communication system and a method for determining a position of a user device in a wireless communication system.

BACKGROUND OF THE INVENTION

FIG. 1 below is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by a heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple accesses, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells.

In addition to the above described terrestrial wireless network also non-terrestrial wireless communication networks exist. FIG. 2 below is a schematic representation of an example of a non-terrestrial wireless communication network 150 including a core network 152 and a radio access network 154. Other than the terrestrial wireless network of FIG. 1, the non-terrestrial wireless network 150 includes a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above mentioned satellites or unmanned aircraft systems. The transceivers 156 and 158 are provided to serve one or more users, like the UE or the IoT device 110 shown in FIG. 2, which are provided on or above ground 160. The UE and the IoT device may be devices as described above with reference to FIG. 1. The arrows $158_1$ to $158_4$ schematically represent uplink/downlink connections for communicating data between the user UE, 110 and the respective transceiver 156, 158. The transceivers 156, 158 are connected to the core network 152 as is schematically represented by the arrows $162_1$, $162_2$. The above described non-terrestrial wireless communication network or system may operate in a similar way as the terrestrial system described above with reference to FIG. 1, for example in accordance with the LTE-advanced pro standard or the 5G or NR, new radio, standard.

It is noted that the information in the above section is only for enhancing the understanding of the background of the invention and therefore it may contain information that does not form conventional technology that is already known to a person of ordinary skill in the art.

Recently, in 3GPP a new study item (SI), introducing Non-terrestrial Networks (NTN) has been started. Within this SI the technical feasibility of various satellite systems (GEO, MEO, LEO, etc.) and High Altitude Platforms (HAPS) to be part of the network architecture of 3GPP Release 17 (Rel-17) will be studied.

In NTN systems the cell based/TA approach to identify the UE location/position is not precise enough to apply e.g. country specific rules/regulations due to the much bigger size of the cells and in consequence the Tracking Area (TA).

In the current 3GPP terrestrial system until Rel-15 and Rel-16, the location of the User Equipment (UE) needs to be known by the network for various different reasons, e.g. Paging of the UE, apply country specific rules/regulations, etc. In the terrestrial systems, two different approaches are specified to identify the location of the UE. The first and classical approach is to identify the UE via the cell and in consequence the corresponding so called Tracking Area (TA). The second approach is to make use of the UE's GNSS (Global Navigation Satellite System) information if available and provide this information to the 5G core network (5GC).

The first approach, to identify the location via the cell and the TA, is not accurate enough in case of NTN due to the big size of the NTN cell and in consequence the high inaccuracy of this location determination method. The second approach by transmitting the UE GNSS location information is only possible if the UEs are equipped with such receivers. In case of NTN, it has already been decided in 3GPP that also UEs without access to GNSS location information shall be support.

For terrestrial (non-NTN) applications, 3GPP supports two main RATs (Radio Access Technology) to determine a UE position namely E-CID (enhanced cell ID) and TDOA (Time Difference Of Arrival). TDOA needs at least four BSs to deliver a UE 3D-position while E-CID derives the measurements from a single BS. The E-CID is a positioning feature originally introduced for LTE. In addition to the serving cell ID, the UE reports the timing advance and estimated timing and power of neighboring cells to the Enhanced Serving Mobile Location Center (E-SMLC). The E-SMLC then estimates the UE position based on this data and the known cell positions. For both approaches the knowledge of the BS position at the LS (Location Server) is needed. If the BS position is not known, the LS can request the BS position via the LPPa protocol (LTE Positioning Protocol Annex), which is defined by the information field *E-UTRAN Access Point Position* (TS 36.455 Section 9.2.8). NRPPa (New Radio Positioning Protocol A, TS 38.455) follows the same procedure as LPPa. FIG. 3 shows a schematic diagram of NRPPa procedure.

FIG. 4 shows a schematic diagram indicating a NG-RAN (New Generation Radio Access Network) UE positioning procedure. According to the TS 38. 305, the procedure is listed as:

1a. Either: some entity in the 5GC (e.g. GMLC) requests some location service (e.g. positioning) for a target UE to the serving AMF.

1b. Or: the serving AMF for a target UE determines the need for some location service (e.g. to locate the UE for an emergency call).

2. The AMF transfers the location service request to an LMF.

3a. The LMF instigates location procedures with the serving ng-eNB or gNB in the NG-RAN—e.g. to obtain positioning measurements or assistance data. (Underline added.)

3b. In addition to step 3a or instead of step 3a, for downlink positioning the LMF instigates location procedures with the UE—e.g. to obtain a location estimate or positioning measurements or to transfer location assistance data to the UE. (Underline added.)

4. The LMF provides a location service response to the AMF and includes any needed results—e.g. success or failure indication and, if requested and obtained, a location estimate for the UE.

5a. If step 1a was performed, the AMF returns a location service response to the 5GC entity in step 1a and includes any needed results—e.g. a location estimate for the UE.

5b. If step 1b occurred, the AMF uses the location service response received in step 4 to assist the service that triggered this in step 1b (e.g. may provide a location estimate associated with an emergency call to a GMLC).

As described above, the procedure and messaging defined in LPPa and NRPPa does not foresee the scenario where the BS position changes over time. Taking E-CID as an example, the position information can be requested through the initial request or measurement reporting procedure as follows:

Initial Request:

If the Report Characteristics IE is set to "OnDemand", the eNB shall return the result of the measurement in the E-CID MEASUREMENT INITIATION RESPONSE message including, if available, the E-UTRAN (Evolved Universal Terrestrial Radio Access Network)Access Point Position IE (Information Element) in the E-CID Measurement Result IE, and the E-SMLC shall consider that the E-CID measurements for the UE has been terminated by the eNB.

If the Report Characteristics IE is set to "Periodic", the eNB shall initiate the requested measurements and shall reply with the E-CID MEASUREMENT INITIATION RESPONSE message without including either the E-CID Measurement Result IE or the Cell Portion ID IE in this message. The eNB shall then periodically initiate the E-CID Measurement Report procedure for the measurements, with the requested reporting periodicity.

Measurement Report Procedure:

The Measured Results IE shall be included in the E-CID Measurement Result IE of the E-CID MEASUREMENT REPORT message when measurement results other than the "Cell-ID" have been requested.

If available, the eNB shall include the E-UTRAN Access Point Position IE which is the configured estimated serving antenna position in the E-CID Measurement Result IE within the E-CID MEASUREMENT REPORT message. Upon reception of this E-UTRAN Access Point Position IE, the E-SMLC may use the value as the geographical position of the E-UTRAN access point. FIG. 5 shows an E-CID measurement result in LPPa.

In LTE, the RTT (Round Trip Time) procedure can be performed by using the procedure known as timing advance type1 or $T_{ADV}$ type1 (3GPP TS 36.305 V15.1.0 (2018-09)). The location server and serving eNB configures the UL and DL RRC (Down Link Radio Resource Control) measurements as shown for one configuration in FIG. 6.

Between the eNB and a UE1 (indicated as Target UE1 in FIG. 6), the UE1 measures the time difference:

$$Rx(UE-eNB) - Tx(UE-eNB) = t_{2\_UE1} - t_{1\_UE1}$$

Similarly, eNB measure the time difference:

$$Rx(eNB) - Tx(UE-eNB) = t_{2\_eNB} - t_{1\_eNB}$$

By rearranging the two differences, the location server can determine the RTT as:

$$2t_p = (t_{2_{eNB}} - t_{1_{UE1}}) + (t_{2_{UE1}} - t_{1\_eNB})$$

However, in NTN currently two different satellite systems are in focus: Low Earth Orbit, LEO, and Geosynchronous Equatorial Orbit, GEO. The GEO has an equal to the Earth's rotational period, and so to ground observers it appears motionless, in a fixed position in the sky. Contrary to the GEO, in case of the LEO satellite system, the satellites move with respect to the earth along predefined and specified routes. Therefore, for determining a position of the UE, it is needed to know a position of moving satellite, i.e., position of the moving transmission reception point.

SUMMARY

An embodiment may have an apparatus for determining a position of a user device, UE, in a wireless communication system, the wireless communication system including one or more moving transmission reception points, TRPs, wherein the apparatus is configured to initiate one or more procedures to perform one or more measurements between the UE and the moving TRP, and to obtain one or more measurement results; and receive at least one message from the moving TRP including a position information of the moving TRP; wherein the position information includes a position of the moving TRP and the time the moving TRP or the UE performed the measurement; wherein the apparatus is capable to determine the position of the user device, UE, using the one or more measurement results, the position of the moving TRP, and the time the moving TRP or the UE performed the measurement.

Another embodiment may have a moving transmission reception point, TRP, for performing one or more measurements between a user device, UE, and the moving TRP, in a wireless communication system, wherein the moving TRP is configured to: perform the measurement of a signal transmission between the UE and the moving TRP, obtain (a) a moving TRP position information element, IE, indicating the position of the moving TRP at the time of the measurement, or (b) a moving TRP position IE and the time of the measurement, and send the moving TRP position IE and/or the time of the measurement.

According to another embodiment, a wireless communication system may have: one or more user devices, UE, one or more inventive moving transmission reception points, TRPs, and the inventive apparatus.

According to another embodiment, a method for determining a position of a user device, UE, in a wireless communication system, the wireless communication system including one or more moving transmission reception points, TRPs, may have the steps of: initiating one or more procedures to perform one or more measurements between the UE and the moving TRP and to obtain one or more measurement results; and receiving at least one message from the moving TRP including a position of the moving TRP; wherein the position information includes a position of the moving TRP, and the time the moving TRP or the UE performed the measurement; wherein the apparatus is capable to determine the position of the UE using the one or more measurement results, the position of the moving TRP, and the time the moving TRP or the UE performed the measurement.

Another embodiment may have a computer program having a program code for performing, when running on computer, an inventive method.

The present invention provides an apparatus, e.g. 5G network core, or location management function, LMF, for determining a position of a user device, UE, in a wireless communication system, e.g. non-terrestrial network, the wireless communication system comprising one or more of moving transmission reception points, TRPs, e.g. movable base station, gNB in 5G, e.g. LEOs: low earth orbit satellites, wherein the apparatus is configured to: initiate one or more procedures to perform one or more measurements between the UE and the moving TRP, and to obtain one or more measurement results; and receive at least one message from the moving TRP comprising a position information of the moving TRP; wherein the apparatus is capable to estimate the position of the UE using the measurement result and the position of the moving TRP.

In accordance with embodiments of the present application, the apparatus is configured to send a request to the moving TRP and/or the UE to perform the measurement of a signal transmission between the UE and the moving TRP, and obtain from the moving TRP and/or the UE the measurement result. That is, for example, in case the Uplink, the moving TRP performs the measurements in response to the request and reports the measurement results to the apparatus, and in case the Downlink, the UE performs the measurements in response to the request and reports the measurement results to the apparatus, and the moving TRP reports the position to the apparatus. In case the Uplink and the Downlink, the UE and the moving TRP perform the measurements in response to the request and report the measurement results to the apparatus.

In accordance with the embodiments of the present application, the request is an Uplink and/or a Downlink procedure, e.g., UL (Uplink) and DL (Downlink) procedure using a round trip time measurement, RTT, or UL procedure using a UL time difference of arrival, TDOA, or an azimuth angle of arrival, AOA, or DL procedure using a DL-TDOA or an azimuth angle of departure, AOD, wherein the apparatus is configured to: perform one or more measurements between the UE and the moving TRP from one Uplink reference signal transmitted and/or one Downlink reference signal transmitted from the UE and the TRP; receive a first message including one or more measurement results from the TRP; wherein the first message includes time information of the transmitted Downlink reference signal and/or one or more measurement results from the Uplink reference signal; and/or receive a second message including one or more measurement results from the UE; wherein the second message includes time information of the transmitted Uplink reference signal and/or one or more measurement results from the Downlink reference signal; receive a third message from the moving TRP comprising a position information of the moving TRP; wherein the apparatus is capable to estimate the position of the UE using the information in the third message and either one or both of the first and second messages. That is, in case the Uplink, the position of the UE is estimated by using the information in the third and first messages, and in case the Downlink, the position of the UE is estimated by using the information in the third and second messages. Furthermore, in case the Uplink-and-Downlink case, the position of the UE is estimated by using the information in the third message and either one or both of the first and second messages. In addition, the Uplink reference signal is identified by a sounding reference signal, SRS, resource ID, and the Downlink reference signal is identified by the PRS resource ID. The apparatus is therefore possible to estimate the position of the user based on a resource related position.

In accordance with the embodiments of the present application, the position information includes a position of the moving TRP and the time the moving TRP or the UE performed the measurement. In addition, the apparatus is configured to send the request on-demand by another network entity, or periodically with a configured or preconfigured periodicity.

In accordance with the embodiments of the present application, the apparatus is configured to receive (a) a moving TRP position information element, IE, e.g. like NR Access point position IE, indicating the position of the moving TRP at the time of the measurement, i.e. the moving TRP position IE with or without a time stamp indicating the time of the measurement, or (b) a moving TRP position IE and the time of the measurement, i.e. information indicating the time of the measurement in addition to the moving TRP position IE.

In accordance with the embodiments of the present application, the procedure performs a set of subsequent measurements from one or more moving TRPs so as to obtain a set of measurement results, and the message from the moving TRP comprises the position information of the moving TRP at an initial measurement, wherein the apparatus is configured to determine the position information of the moving TRP at a further measurement using a trajectory of the moving TRP.

In accordance with the embodiments of the present application, the measurement is a round trip time measurement, RTT, wherein the position of the moving TRP are different at the time of transmission of a measurement signal from the time of reception of the measurement signal, and the apparatus is configured to estimate the position of the UE by solving a positioning equation in least square sense using the trajectory of the moving TRP for calculating pseudoranges between the UE and each of the position of the moving TRP where the RTT measurement is made.

In accordance with the embodiments of the present application, the procedure indicates a number of the measurements to be performed, wherein the number of the measurements is at least three, e.g. the measurement between the same UE and the same TRP is performed at least three times.

In accordance with the embodiments of the present application, the obtained measurement result includes one or more of: a time of arrival measurement, e.g. RSTD: reference signal time difference, RTOA: relative time of arrival, TA: timing advance or RTT: round trip time, an angle based measurement, e.g. AOA: azimuth angle of arrival or AOD: azimuth angle of departure, and/or a power based measurement, e.g. RSPP: reference signal received power or SINR: signal to interference noise ratio.

In accordance with the embodiments of the present application, the obtained position information includes one of a quality or accuracy of the moving TRP position, or a source of the position of the moving TRP, e.g. GNSS, IMU (inertial measurement unit), or data base (e.g. stored as two line elements TLE in the NORAD database or similar).

In accordance with the embodiments of the present application, the apparatus is configured to obtain a position time record, wherein the position time record provides the apparatus with the position history for the moving TRP by providing the position and time corresponding to the position, or the position displacement from the initial position.

In accordance with the embodiments of the present application, the procedure indicates a time interval for the measurements and a number of measurement results to be obtained, e.g. in case a measurement is not valid/succeed, measurement is repeated in dependence on the indicated time interval until needed number of positioning signals is obtained.

In accordance with the embodiments of the present application, the apparatus is configured to initiate the measurement between the UE and more than one moving TRPs, e.g. in case the same target area ID is shared by the multiple satellites, the request is sent to each satellite.

In accordance with the embodiments of the present application, the apparatus is to apply an enhanced cell ID approach or time difference arrival approach for determining the UE position. In addition, the apparatus is a location management function.

The present invention provides a moving transmission reception point, TRP, for performing one or more measurements between a user device, UE, and the moving TRP, in a wireless communication system, wherein the moving TRP is configured to perform the measurement of a signal transmission between the UE and the moving TRP, obtain (a) a moving TRP position information element, IE, e.g. like NR Access point position IE, indicating the position of the moving TRP at the time of the measurement, i.e. the moving TRP position IE with or without a time stamp indicating the time of the measurement, or (b) a moving TRP position IE and the time of the measurement, i.e. information indicating the time of the measurement in addition to the moving TRP position IE, and send the moving TRP position IE and/or the time of the measurement.

The present invention provides a wireless communication system comprising one or more user devices, UE, one or more moving transmission reception points, TRPs, and the apparatus according to the present application.

In accordance with the embodiments of the present application, the wireless communication system includes
a terrestrial network, or
a non-terrestrial network, or networks or segments of networks using as a terminal an
airborne vehicle or a spaceborne vehicle, or
a combination thereof.

In accordance with the embodiments of the present application, the UE is one or more of
a mobile terminal, or
stationary terminal, or
cellular IoT-UE, or
vehicular UE, or
an IoT or narrowband IoT, NB-IoT, device, or
a ground based vehicle, or
an aerial vehicle, or
a drone, or
a moving base station, or
road side unit, or
any other item or device provided with network connectivity enabling the item/device to communicate using the wireless communication network, e.g., a sensor or actuator, and wherein the transmission point comprises one or more of
a macro cell base station, or
a small cell base station, or
a central unit of a base station, or
a distributed unit of a base station, or
a road side unit, or
a UE, or
a remote radio head, or
a spaceborne vehicle, like a satellite or a space vehicle at a specific altitude and orbital period or plane, e.g., a low earth orbit (LEO), a medium earth orbit (MEC)), a geosynchronous orbit (GSO), a geostationary orbit (GEO), or a high earth orbit (HEO), or
an airborne vehicle, like an unmanned aircraft system (UAS), e.g., a tethered UAS, a lighter than air UAS (LTA), a heavier than air UAS (HTA) and a high altitude UAS platforms (HAPs), or
any transmission/reception point, TRP, enabling an item or a device to communicate using the wireless communication network, the item or device being provided with network connectivity to communicate using the wireless communication network.

The present invention provides a method for determining a position of a user device, UE, in a wireless communication system, e.g. non-terrestrial network, the wireless communication system comprising one or more of moving transmission reception points, TRPs, e.g. movable base station, gNB in 5G, e.g. LEOs: low earth orbit satellites, wherein the method comprises: initiating one or more procedures to perform one or more measurements between the UE and the moving TRP and to obtain one or more measurement results; and receiving at least one message from the moving TRP comprising a position of the moving TRP; wherein the apparatus is capable to estimate the position of the UE using the measurement result and the position of the moving TRP.

The present invention provides a non-transitionary computer program product having a program code for performing, when running on computer, a method according to the present invention.

BRIEF DESCRIPTION OF THE DRAWINGS

Embodiments of the present invention will be detailed subsequently referring to the appended drawings, in which:
FIG. 5 shows a sample of measurement results of E-CID in LPPa according to conventional technology;
FIG. 14 shows a sample of measurement results according to the embodiment of the present application.

DETAILED DESCRIPTION OF THE INVENTION

Embodiments of the present invention are now described in more detail with reference to the accompanying drawings in which the same or similar elements have the same reference signs assigned. At first, some functions for understanding the present invention are explained.

Figure 1:
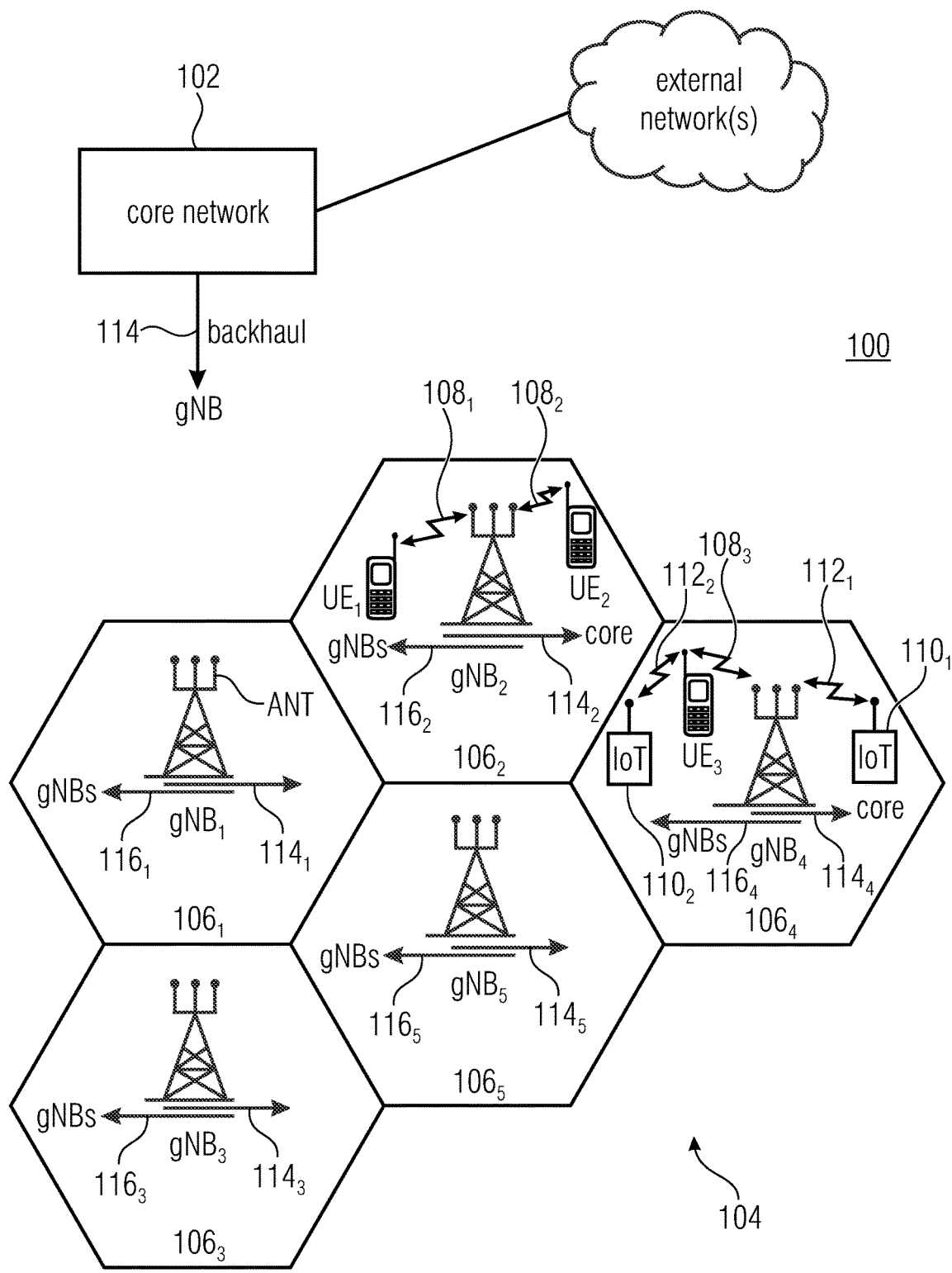
FIG. 1 shows a schematic representation of an example of a wireless communication system.
Figure 2:
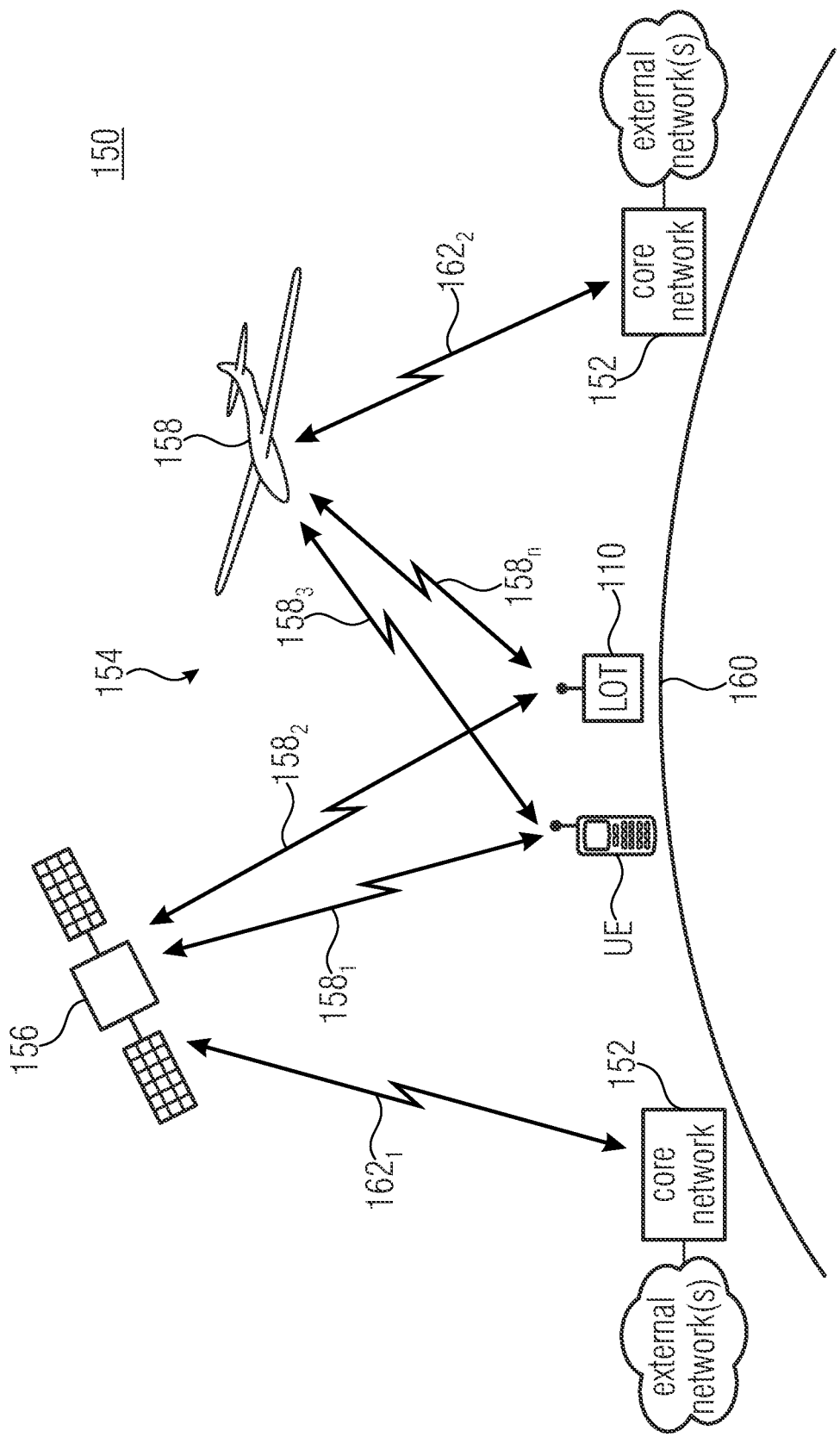
FIG. 2 is a schematic representation of an example of a non-terrestrial wireless communication network including a core network and a radio access network.
Figure 3:
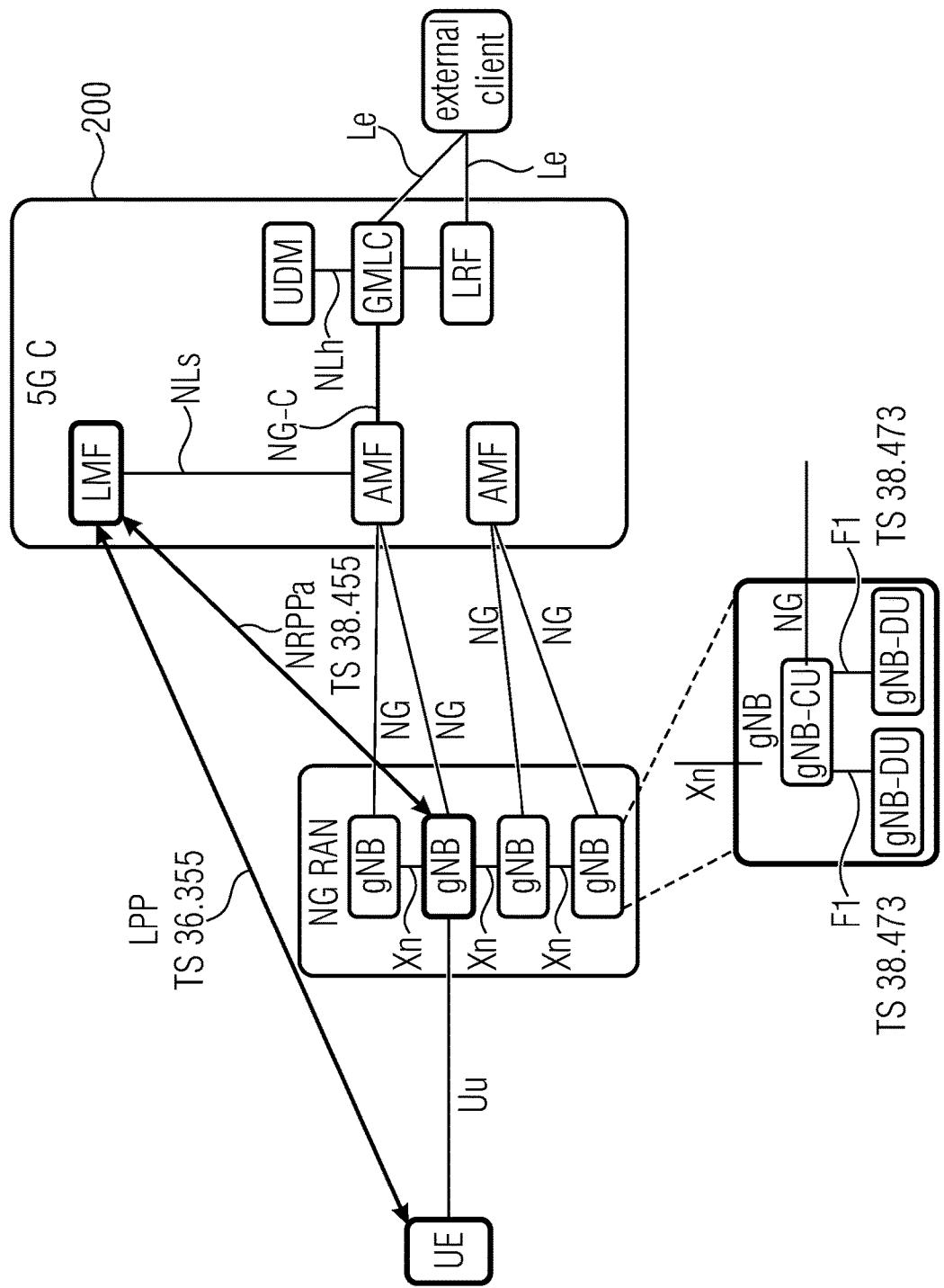
FIG. 3 shows a schematic block diagram indicating a New Radio, NR, positioning architecture according to conventional technology.
Figure 4:
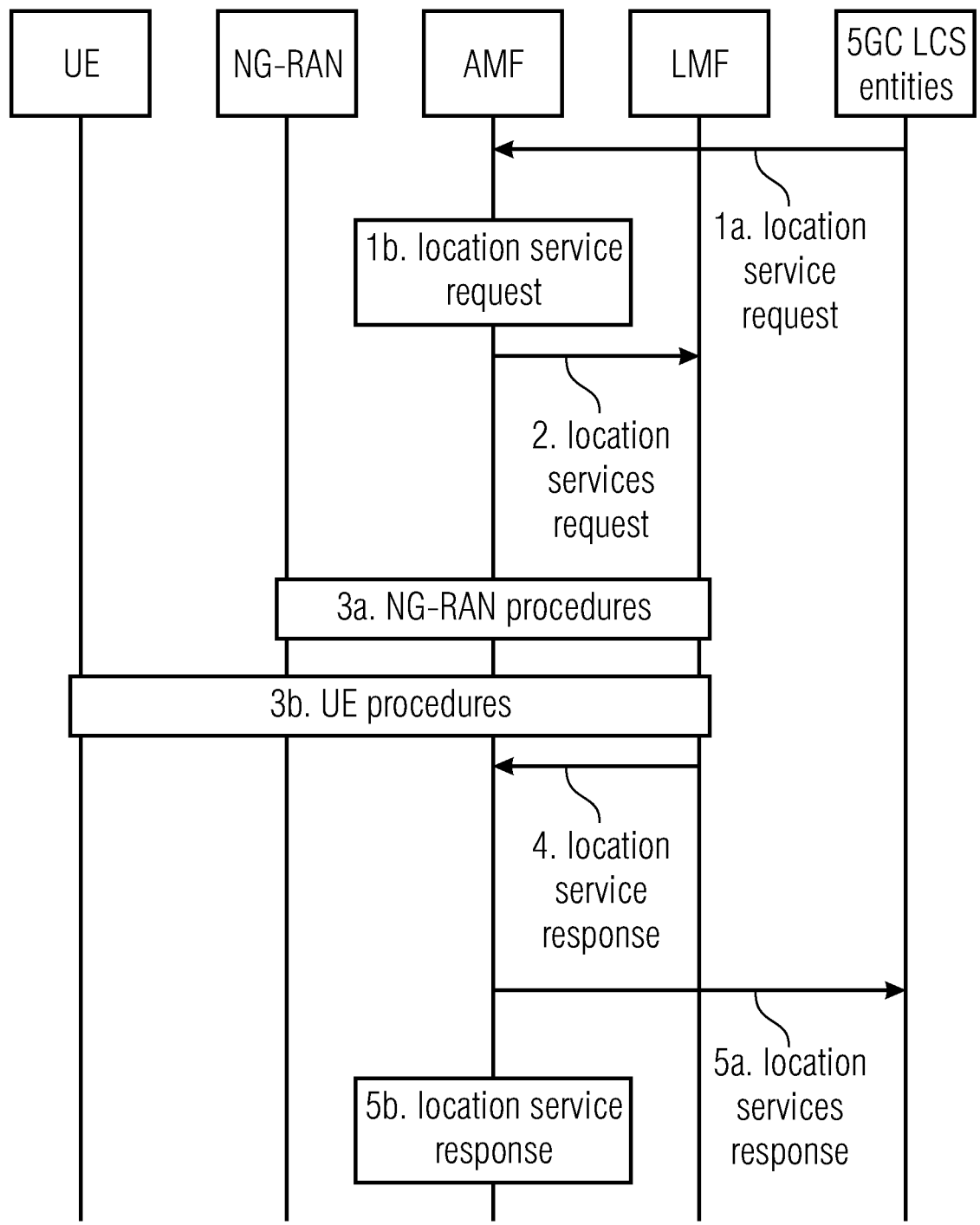
FIG. 4 shows a schematic diagram indicating a location service supported by New Generation Radio Access Network, NG-RAN, according to conventional technology.
Figure 6:
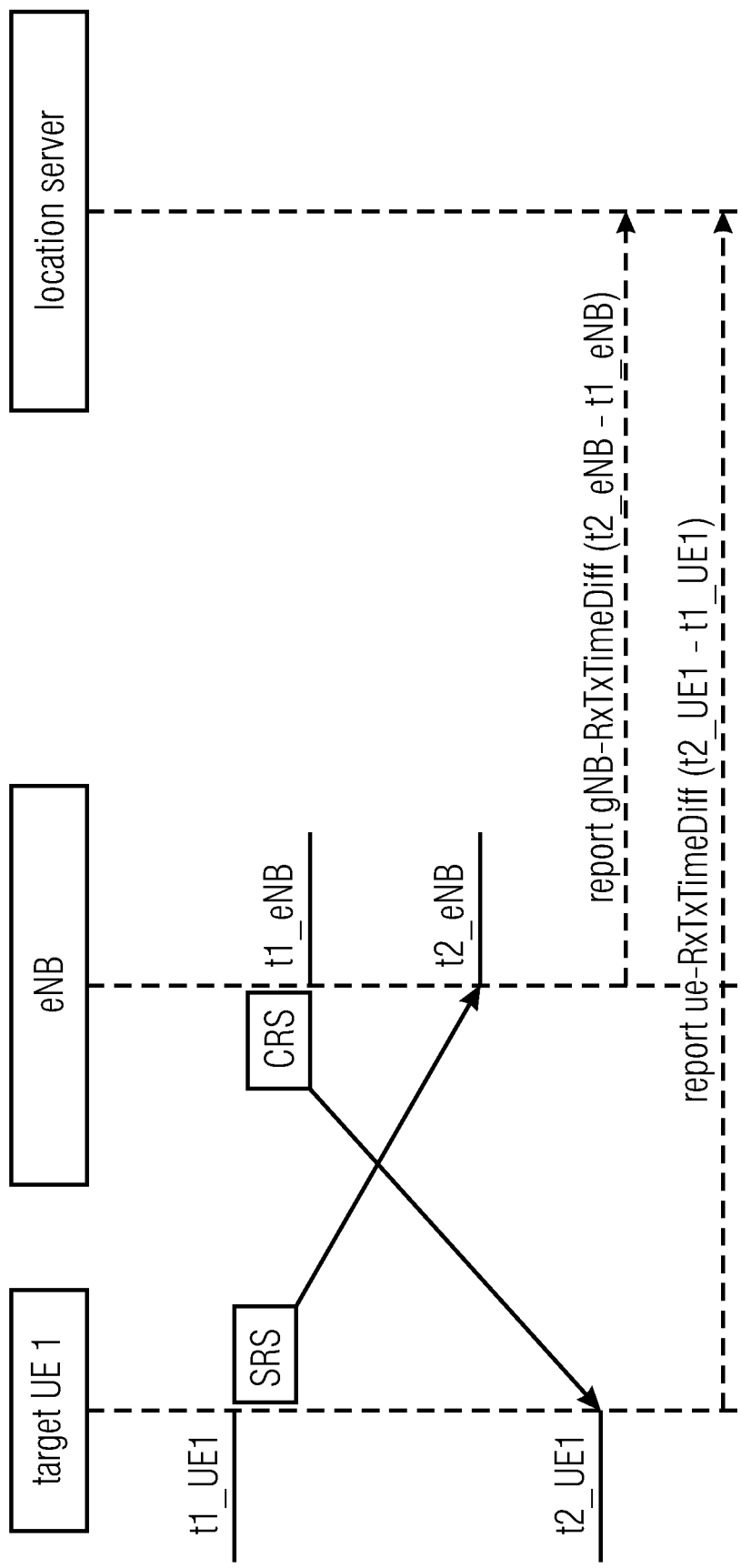
FIG. 6 illustrates an example of E-CID procedure in LTE, i.e., timing advance type 1 according to conventional technology.
Figure 7:
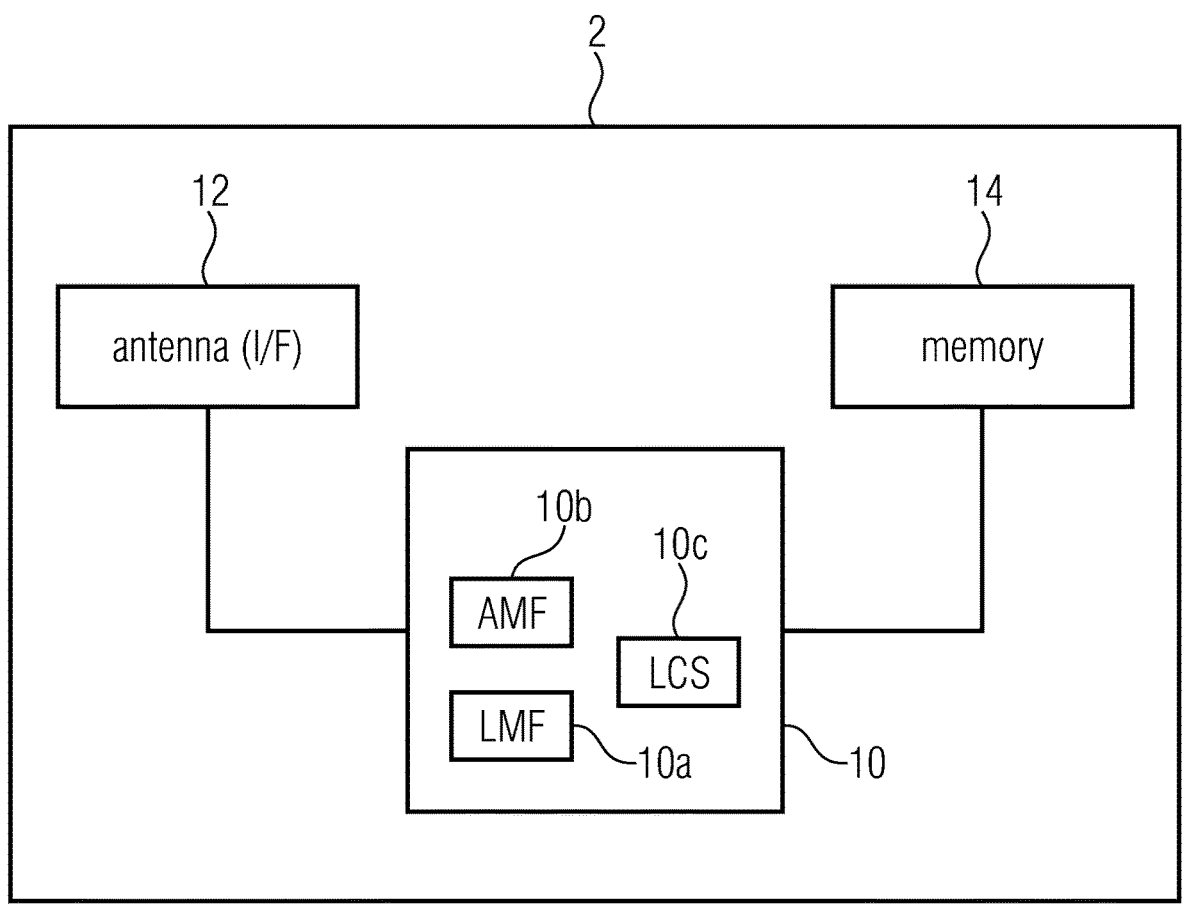
FIG. 7 shows a schematic block diagram representing an apparatus according to embodiments of the present application.

FIG. 7 shows a schematic diagram representing an apparatus 2 according to the present application. The apparatus 2 shown in FIG. 2 comprises a processor 10, an antenna (communications interface) 12 and a memory 14. The processor 10 comprises or may work as a Location Management Function, LMF, 10a, an Access and Mobility Function management, AMF, 10b and a LoCation Service, LCS, 10c. The LCS 10b may be provided as an external client of the apparatus 2.

The LMF 10a has fundamental functions, for example, to manage the overall co-ordination and scheduling of resources needed for the location of a UE that is registered with or accessing 5G core network. It also calculates or verifies a final location and any velocity estimate and may estimate the achieved accuracy. The LMF interacts with the UE in order to exchange location information applicable to the UE assisted and UE based position methods, e.g. E-CID in order to obtain location information. The AMF 10b contains functionality responsible for managing positioning for the UE for all types of location request.

The apparatus 2 initiates one or more procedures to perform one or more measurements between the UE and the moving TRP, and to obtain one or more measurement results. That is, in case of uplink, the apparatus 2, i.e., the LMF 10b, sends a request to one or more of the moving TRPs to perform one or more measurements between the UE and the moving TRP and to obtain one or more measurement results. In case of downlink, the LMF 10b sends a request to the UE, i.e. a target UE, to perform one or more measurements between the UE and the moving TRP and to obtain one or more measurement results. In case both of uplink and downlink, the request is sent to the moving TRP and the UE. The apparatus 2 obtains the measurement result by receiving the measurement result transmitted from the moving TRP and/or the UE via antenna 12 and the obtained measurement result is stored in the memory 14. In addition, the apparatus 2 receives at least one message from the moving TRP comprising a position information of the moving TRP, e.g. a moving TRP position information element, IE, e.g. like NR Access point position IE, indicating the position of the moving TRP at the time of the measurement, i.e. the moving TRP position IE with or without a time stamp indicating the time of the measurement, or a moving TRP position IE and the time of the measurement, i.e. information indicating the time of the measurement in addition to the moving TRP position IE. The received message is stored in the memory in association with the measurement result. Then, the apparatus 2 is capable to estimate the position of the UE using the measurement result and the position of the moving TRP. For example, the apparatus 2 applies an enhanced cell ID approach or time difference arrival approach for determining the UE position.

Figure 8:
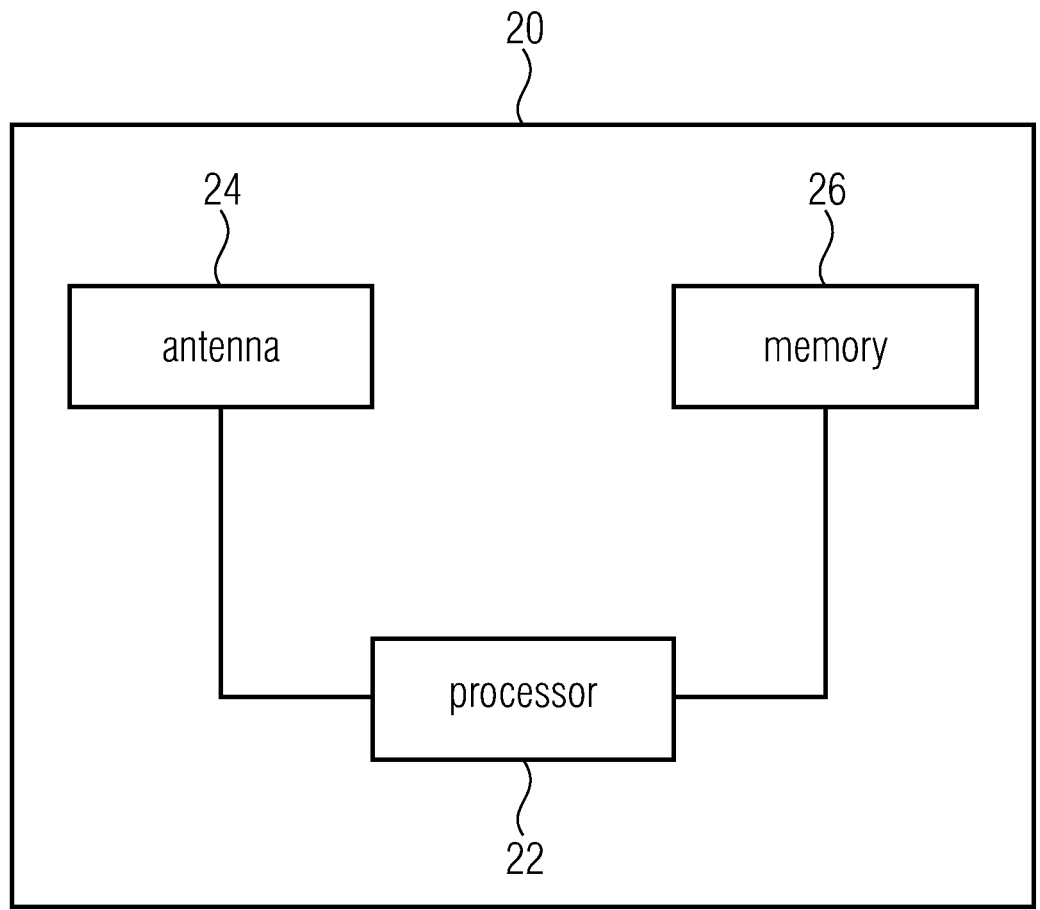
FIG. 8 shows a schematic block diagram representing a moving transmission reception point, TRP, according to embodiments of the present application.

FIG. 8 shows a schematic block diagram representing a moving transmission reception point, TRP according to the embodiments of the present application. As shown in FIG. 8, the moving TRP 20 comprises a processor 22, an antenna (communication interface) 24, and memory 26. The moving TRP 20 performs the measurement of a signal transmission between the UE and the moving TRP, obtains (a) a moving TRP position information element, IE, e.g. like NR Access point position IE indicating the position of the moving TRP at the time of the measurement, i.e. the moving TRP position IE with or without a time stamp indicating the time of the measurement, or (b) a moving TRP position IE and the time of the measurement, i.e. information indicating the time of the measurement in addition to the moving TRP position IE, and sends the moving TRP position IE and/or the time of the measurement. In the memory 26, for example the trajectory of the moving TRP is stored.

As already mentioned above, the moving TRP in the wireless communication system according to the present application is the moving TRP, e.g. low earth orbit satellites. The LEO satellites, gNBs in 5G, move with respect to earth along predefined and specified routes, which can be predicted by the network based on the trajectory information in the case the satellite, i.e., a moving transmission reception point, moving TRP, or the moving TRP is equipped with a GNSS device. So, the exact position of each satellite is known for each point (each measurement point) in time. That in case the moving TRP provides at least one message comprising a position information of the moving TRP to the apparatus, then, the apparatus is able to estimate the position of the UE using the measurement result and the position of the moving TRP.

In order to provide the location information of the satellite to the network the E-CID (Enhanced Cell-ID) can be used. That is, by using the trajectory of two or more satellites, a 3D distribution of anchors can be synthetically generated. By calculating pseudoranges between the UE and each of the position of the satellite where RTT measurement is made, the positioning equation can be solved in least square sense if there are at least four points that are sufficiently spatially distributed to enable positioning.

With the E-CID multiple measurements between one at different positions or more satellites and the UE, the location can be calculated by the network and can be provided to the LMF (Location Measurement Function) of the 5GC, i.e. to the apparatus of the present application. These measurements can be based on Time Of Arrival (TOA) measurements (RSTD: reference signal time difference, RTOA: relative time of arrival, TA: timing advance or RTT: round trip time), angle based (AOA: azimuth angle of arrival or AOD: azimuth angle of departure) or power based (RSPP: reference signal received power or SINR: signal to interference noise ratio). All of these can be expressed as a function of both the satellite and UE positions and contain information that can be used for positioning of the UE if the satellite positions are known. In the following this will be explained with an example using RTT signaling.

Figure 9:
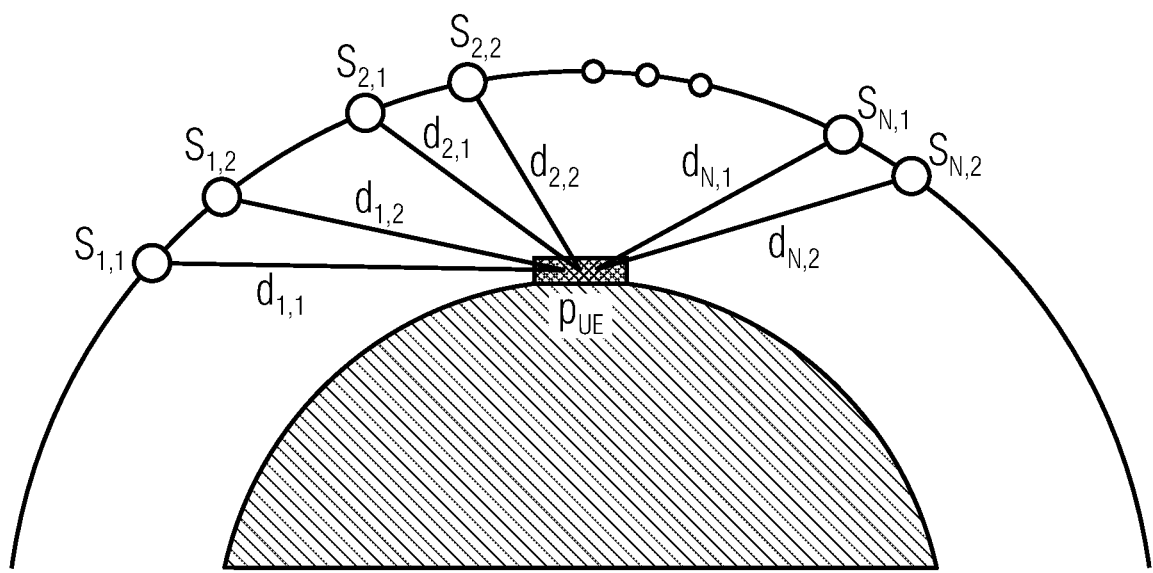
FIG. 9 shows a schematic illustration of the Round Trip Time, RTT, based positioning example according to the embodiments of the present application.

Due to the high speed of NTN satellites, the relative location of the satellite with respect to the UE varies highly within a short time interval, for example as indicated in FIG. 9. Therefore, a set of subsequent positioning measurements from a single satellite can be employed for localization purposes.

Example: In case of the RTT, multiple subsequent RTTs can be used as synthetic "anchors", that, over the time-of-visibility, are arranged in a spatial distribution suitable for positioning task in terms of dilution-of-precision (DOP). This is especially true if more than one satellites are used.

The positioning problem is illustrated in FIG. 9 and can be formulated as follows:

The position of the UE $p_{UE}$ is assumed constant and unknown in this interval. The satellite moves along its orbit, and is able to obtain round-trip-times (RTTs) to the UE. Because of the high speed of the satellite, the two trips of the RTT can vary significantly, so that both the position of the satellite at the time of transmission (e.g. $s_{1,1}$ for the first RTT) and reception ($s_{1,2}$ for the first RTT) vary greatly, resulting in varying distances $d_{1,1}$ and $d_{1,2}$, respectively.

For a single satellite, the positioning information for multiple RTTs can be written as:

$$RTT_1 = (d_{1,1} + d_{1,2})/c$$
$$RTT_2 = (d_{2,1} + d_{2,2})/c$$
$$\vdots$$
$$RTT_N = (d_{N,1} + d_{N,2})/c,$$

Where c denotes the signal propagation speed.

The formulation of the problem yields the following observations:

The equation system is underdetermined if the positions of the satellite on the orbit are unknown, as the distances are dependent on both the user and satellite positions.

The equation system is solvable if the positions of the satellite are known and at least 3 satellite positions are available.

The satellite positions should be distributed among the field-of-vision of the UE so that a good dilution-of-precision (DOP) can be reached The inclusion of additional satellites and/or positioning signals should be highly beneficial in terms of expected accuracy.

By using the trajectory of two or more satellites, a 3D distribution of anchors can be synthetically generated. By calculating pseudoranges between the UE and each of the position of the satellite where RTT measurement is made, the positioning equation can be solved in least square sense if there are at least four points that are sufficiently spatially distributed to enable positioning.

This leads to the conclusion that the knowledge of the satellite (or multiple satellite) positions is essential to enable positioning of the UE.

Apart from RTTs (via Timing Advance values), E-CID signaling provides other Time-of-Arrival based signals, Angle-of-Arrival (AoA) estimates and RSRP signaling. Both can be employed in a positioning algorithm in a similar manner: The RSRP or other power-based signals can be transformed into an additional estimate of the distance between the satellite and UE and the AoAs or other angle-based signal can be expressed as a function of the satellite and UE position. Other TOA signals can also be expressed in a similar manner as a function of the UE and satellite positions.

Since all the signals suitable for positioning are dependent on the both the position of the UE (the state of interest) and the position of the satellites at the time corresponding to the observation, it is very important that the appropriate signaling provides the LMF with:

1. The positioning signal (e.g. E-CID)
2. AND/OR The corresponding times
3. AND/OR The corresponding satellite position
4. AND/OR a set of prior sets of observations (1.-3.), so that the current and previous quantities can be combined The positions can then be extracted using one of the known methods, for example, Bayesian Tracking filters or Least-Squares Methods.

Figure 10:
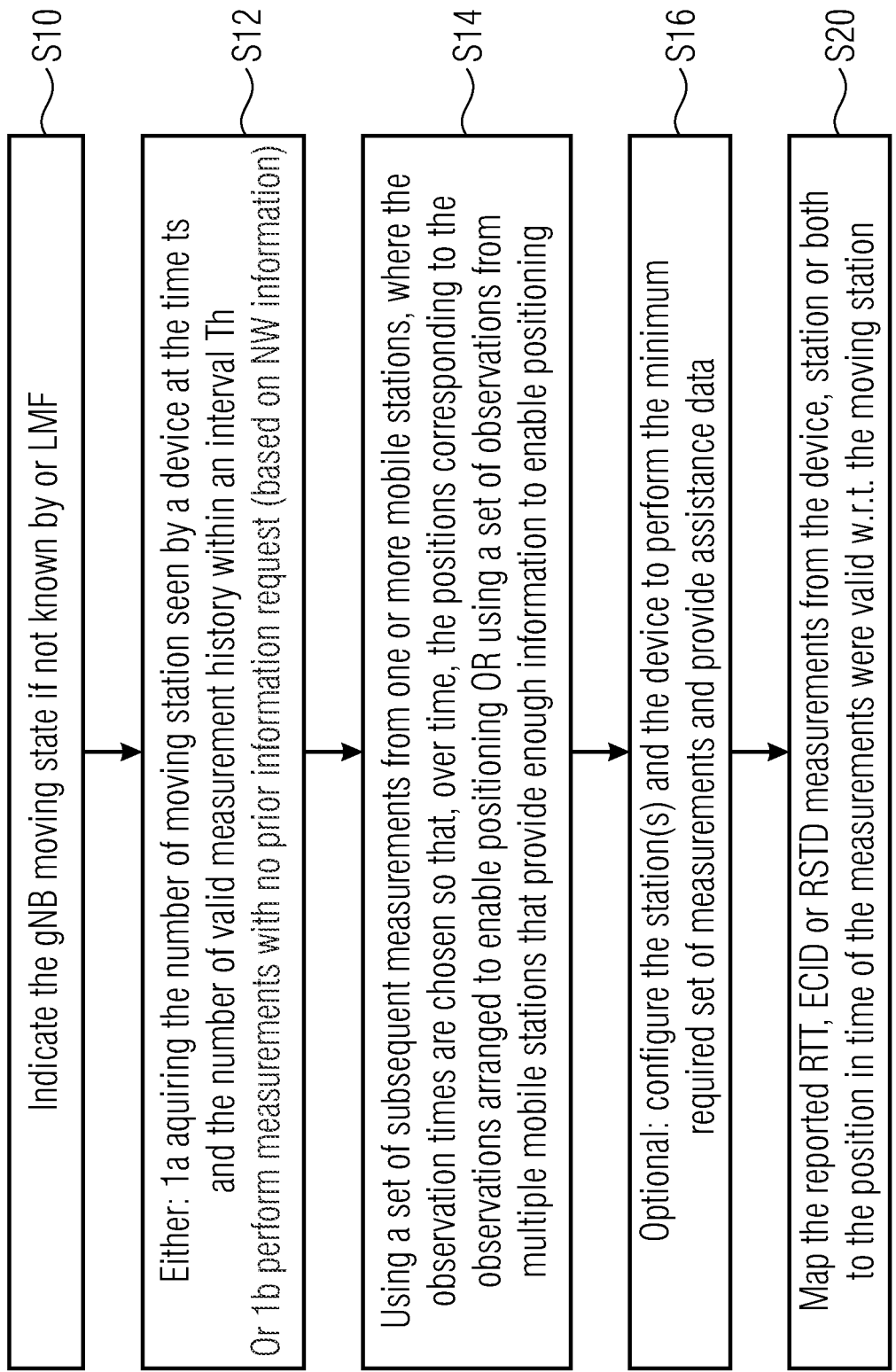
FIG. 10 shows a flowchart indicating the procedure performed at the apparatus according to the embodiments of the present application.

FIG. 10 shows a flowchart indicating the procedure performed at the apparatus according to the embodiments of the present application. As shown in FIG. 10, if the moving state of the moving TRP (the gNB) is not known by the LMF, i.e., the apparatus, the moving state of the moving TRP is indicated to the LMF (S10).

Then proceeds either (1a) acquiring the number of the moving station (moving TRP) seen by a device (the UE) at time is and the number of valid/succeed measurement history within an interval Th, or (1b) perform measurements with no prior information request (based on network information) (S12). That is, the moving TRP sends at least one message comprising a position information of the moving TRP to the apparatus. The message may further comprise the measurement time or optionally the quality of the position information and information indicating the position record.

In the next step, the apparatus 2 estimates the position of the moving TRP by using a set of subsequent measurements from one or more mobile stations (the moving TRP), where the observation times are chosen so that, over time, the positions corresponding to the observation arranged to enable positioning, or using a set of observations from multiple mobile stations that provide enough information to enable positioning (S14).

Optionally, it is possible to configure the station(s) (moving TRP(s)) and the device (UE) to perform the minimum needed set of measurements and provide assistance data (S16). For example, it is possible to indicate a number of the measurements to be performed, e.g. at least three, e.g. the measurement between the same UE and the same TRP is performed at least three times, and/or to indicate a time interval for the measurements and a number of measurement results to be obtained, e.g. in case a measurement is not valid/succeed, measurement is repeated in dependence on the indicated time interval until needed number of positioning signals is obtained.

Figure 11:
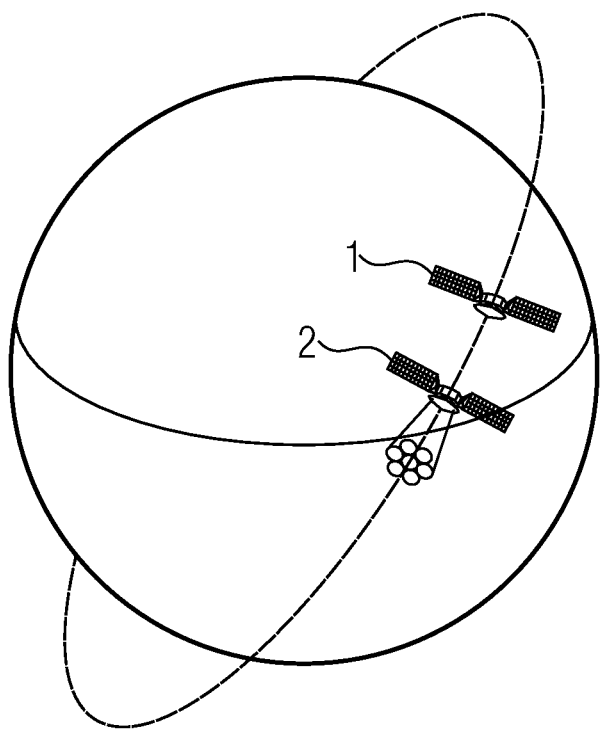
FIGS. 11(a) and 11(b) show a schematic illustration to explain the distance between the UE and TRPs, i.e., satellites 1 and 2.
Figure 11:
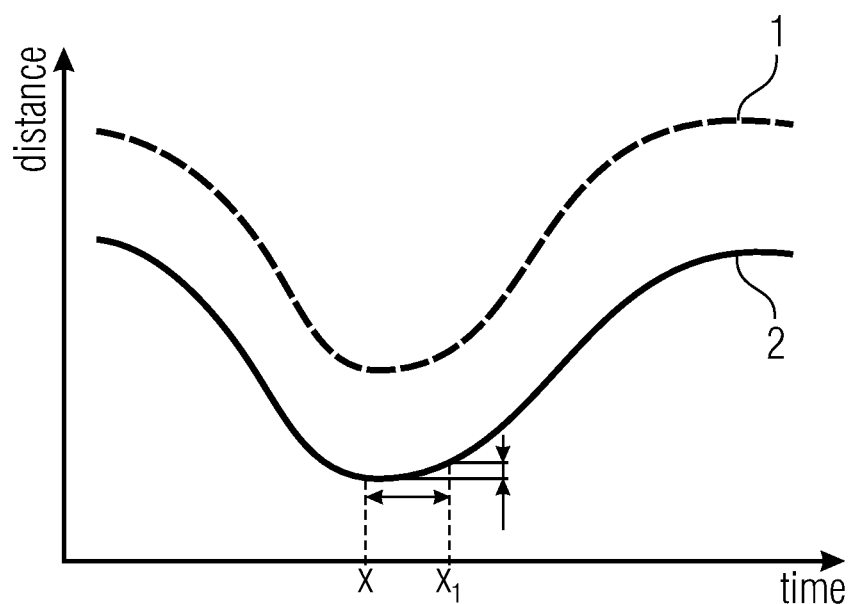

Then, the apparatus 2 maps the reported RTT, E-CID or RSTD measurements from the device (UE), station (moving TRP) or both to the position in time of the measurements were valid with regard to the moving station (moving TRP) (S20). That is, the moving TRP, for example, moving TRPs 1 and 2 move as indicated in FIG. 11(a) and the distance between the moving TRP 1 and the UE, and the distance between the moving TRP 2 and the UE may change as indicated in FIG. 11(b). In other words, cause of high speed movement of the moving TRP, the distance between the UE and the moving TRP, for example, the moving TRP 2, is changed in a very short time. For example, as indicated in FIG. 11(b), the difference the distance between the UE and the moving TRP 2 at the time x from the distance between the UE and the moving TRP 2 at the time x1 could be large.

Figure 12:
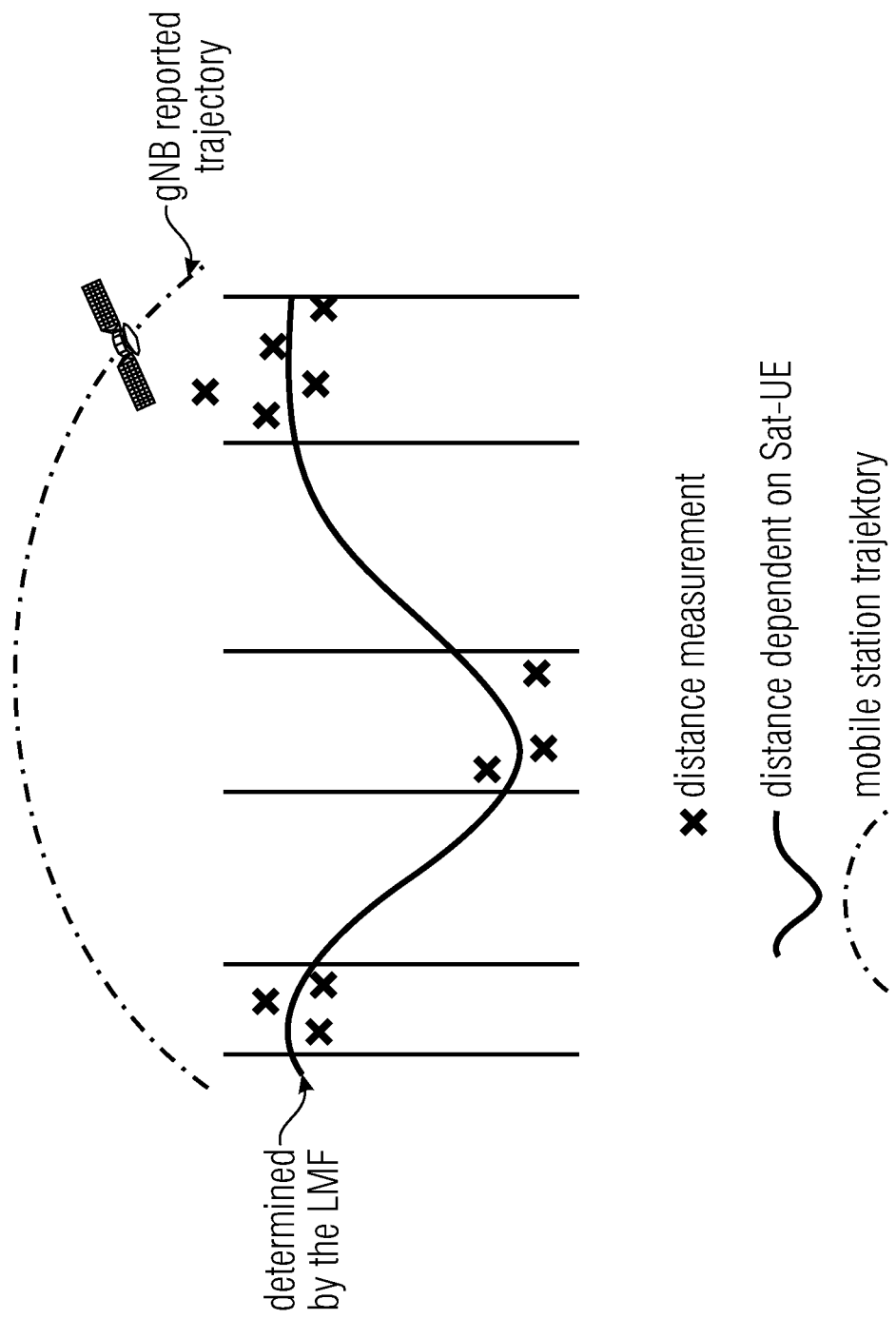
FIG. 12 shows a schematic diagram illustrating change of the distance between the UE and the moving TRP according to the embodiments of the present invention.

FIG. 12 shows a schematic diagram illustrating change of the distance between the UE and the moving TRP. A dashed line indicates the trajectory of the moving TRP which is reported from the moving TRP to the apparatus 2, the x mark indicates the distance between the moving TRP and the UE when the measurement was performed and waved line indicates the distance between the moving TRP and the UE determined by the apparatus by using the mapped measurement results. As shown in FIG. 12, the position of the moving TRP is moving and therefore, the position information of the moving TRP indicates a position of the moving TRP at an initial measurement, e.g. at the time t=0, i.e., the position of the moving TRP are different at the time of transmission of a measurement signal from the time of reception of the measurement signal. Hence, it is needed to determine the position information of the moving TRP at a further measurement, e.g. a round trip time measurement, RTT, using a trajectory of the moving TRP.

Figure 13:
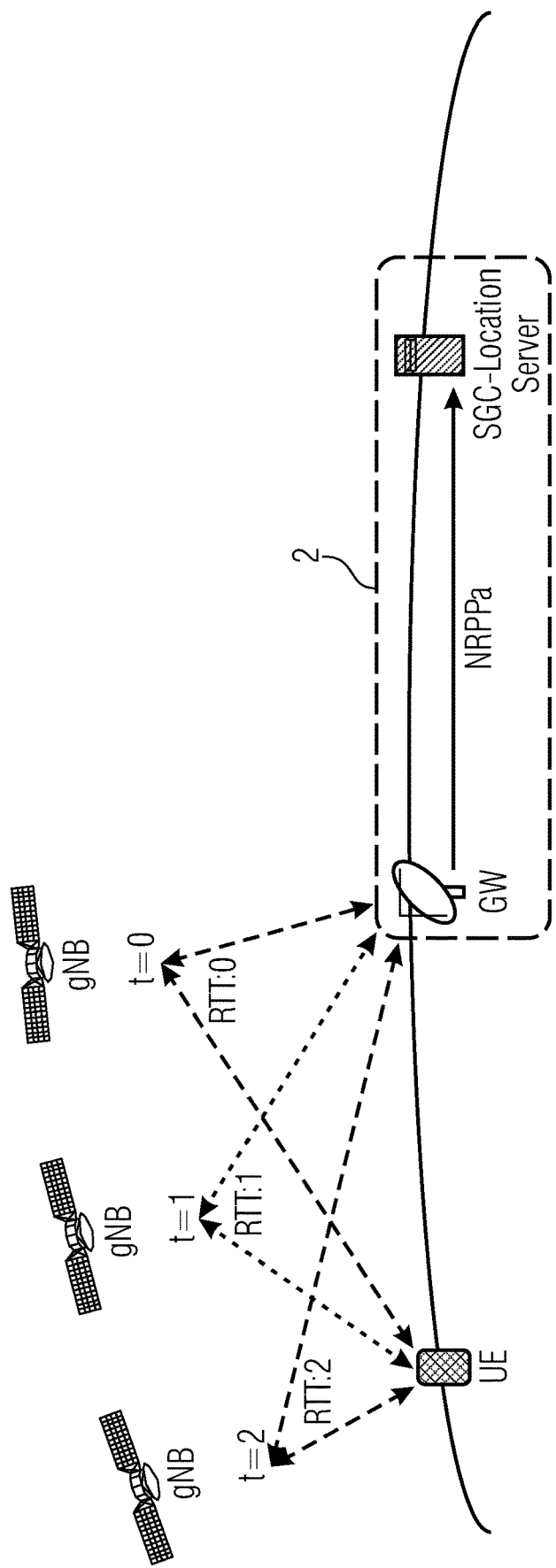
FIG. 13 shows a schematic illustration indicating the positioning procedure according to the embodiments of the present application.

FIG. 13 shows a schematic illustration indicating the positioning procedure according to the embodiments of the present application. The apparatus 2 in FIG. 13 includes a gate way (antenna) and 5GC location server, and the measurement results from the moving TRP are transmitted by using a NRPPa. The positioning procedure indicated in FIG. 13 comprises following steps:

1. One or multiple measurements performed within a time interval. In FIG. 13, it is indicated that three measurements are performed, i.e., the measurement RTT:0 at t=0, the measurement RTT:1 at t=1, and the measurement RTT:2 at t=2.
2. The mobile station (moving TRP) reports its trajectory and the time the measurements took place by sending current a previous location information. That is, the position of the moving TRP changed along to its trajectory, and therefore, not only the position at the time the measurements took place but also its trajectory is informed to the apparatus (LMF).

3. The LMF (the apparatus 2) applies different Hypothesis to estimate a possible match based on the measurements and trajectory information. The apparatus 2 determines the current position of the moving TRP based on the position of the moving TRP at the time the measurement took place and its trajectory.
4. The LMF estimate the UE position based on the filtered measurements. That is, the apparatus estimates the position of the UE by solving a positioning equation in least square sense using the trajectory of the moving TRP for calculating pseudoranges between the UE and each of the position of the moving TRP where the RTT measurement is made.

The above described procedure enables the Network Entity (NE) to determine the UE position based on the position of the moving TRP and measurement results by extending the 3GPP Interfaces to support UE-assisted positioning with a moving base station (moving TRP).

NRPPa Reporting Procedure (gNB←→LMF)

E-CID Measurement Initiation Procedure:

The purpose of E-CID Measurement Initiation procedure is to allow the E-SMLC or LMF to request the gNB to report E-CID measurements used by E-SMLC or LMF to compute the location of the UE (see, for example, 3GPP TS38.455). The reporting mechanisms enabled in LPPa and NRPPa include OnDemand and Periodic Reporting:

For the case the positioning is On-Demand, i.e. a request to the moving TRP and/or the UE to perform the measurement of a signal transmission between the UE and the moving TRP is send on-demand by another network entity, performed with a moving station (m-gNB, moving TRP) the LMF requests the m-gNB to perform one of the two alternatives on the NRPPa interface (see for example, 3GPP TS38.455):

Alternative 1:

If the gNB, or the transmission-reception-point unit controlled or corresponding to the gNB, is a moving unit, the NR Access Point Position IE in the E-CID Measurement Result IE (Information Element) corresponds to the position in time where the measurements is valid/succeed (related to the E-CID physical signaling).

Or

Alternative 2:

If the gNB, or the transmission-reception-point unit controlled or corresponding to the gNB, is a moving unit, the NR Access Point Position IE in the E-CID Measurement Result IE is signaled with the time corresponding to the time where the measurement is valid/succeed (related to the E-CID physical signaling).

For the case the positioning is Periodic Report configuration, i.e. a request to the moving TRP and/or the UE to perform the measurement of a signal transmission between the UE and the moving TRP is send periodically with a configured or preconfigured periodicity, performed with a moving station (m-gNB) the LMF instructs that the m-gNB over the NRPPa interface (see, for example, 3GPP TS38.455) to:

The gNB shall periodically initiate the E-CID Measurement Report procedure for the measurements, with the requested reporting periodicity. The E-CID measurement report shall Access Point Position IE which is the configured estimated serving antenna position at time the measurement where taken or include the time where the measurements were taken.

E-CID Measurement Initiation Response

The message measurement initiation response is sent by gNB (moving TRP) to indicate that the requested E-CID measurement is successfully initiated. The gNB can inform the LMF (apparatus) if the station category moving or stationary. In addition, the moving gNB can inform it state: moving, stationary. However, as a prerequisite, the TRP or gNB according to the present application is a moving satellite.

E-CID Measurement Report:

The purpose of Measurement Report procedure is for the gNB (moving TRP) to provide the measurements for the UE to the E-SMLC. The Measured Results IE shall be included in the MEASUREMENT REPORT message when measurement results have been requested. For E-CID the Procedure will hence imply that:

"If available, the gNB shall include the Access Point Position IE which is the configured estimated serving antenna position in the E-CID Measurement Result IE within the E-CID MEASUREMENT REPORT message at the time the measurement started or the time where the E-CID measurements are valid. Upon reception of this E-UTRAN Access Point Position IE, the E-SMLC may use the value as the geographical position of the E-UTRAN access point".

The Measurement information shown in FIG. 5 can be extended as shown in FIG. 14. For example:

NR Access Point Position: The configured estimated geographical position of the antenna of the cell or TRP (transmission reception point). The field can correspond to a gNB-CU, gNB-DU or to the position point of the transmission measurement relay.

NR Access Point Position Quality: indicate the quality of position estimate. The quality could depend on the GNSS quality or the IMU.

NR Access Point Position Source: method of determining the position, e.g. the GNSS, measurement, estimated trajectory, Inertial sensors or the like.

Time of the Position measurement: Indicates the time where the measurements are valid. For the case of stationary Access Point this field is not reported. If the position point is reported, the LMF uses this information to map the measurements to the access point position. If the position point is not reported, the LMF uses this information to map the measurements to the known trajectory information or provides it to the Client aware of the m-gNB trajectory information.

Position Time Record: If configured, the m-gNB can report the displacement from the initial position or the absolute position of different observation times together (i.e. providing information on the trajectory from previous events). Under the assumption that the movement of the UE within the time interval of the observation is small enough, the observations can be used together in a positioning method.

In addition to the above mentioned explanations, a wireless communication system comprising one or more user devices, UE, one or more moving transmission reception points, TRPs, according to the embodiment of the present application and the apparatus according to any one of the embodiments of the present application.

The wireless communication system includes a terrestrial network, or a non-terrestrial network, or networks or segments of networks using as a terminal an airborne vehicle or a spaceborne vehicle, or a combination thereof.

The UE is one or more of, a mobile terminal, or stationary terminal, or cellular IoT-UE, or vehicular UE, or an IoT or narrowband IoT, NB-IoT, device, or a ground based vehicle, or an aerial vehicle, or a drone, or a moving base station, or road side unit, or any other item or device provided with network connectivity enabling the item/device to communicate using the wireless communication network, e.g., a sensor or actuator.

The moving TRP comprises one or more of, a macro cell base station, or a small cell base station, or a central unit of a base station, or a distributed unit of a base station, or a road side unit, or a UE, or a remote radio head, or a spaceborne vehicle, like a satellite or a space vehicle at a specific altitude and orbital period or plane, e.g., a low earth orbit (LEO), a medium earth orbit (MEC)), a geosynchronous orbit (GSO), a geostationary orbit (GEO), or a high earth orbit (HEO), or an airborne vehicle, like an unmanned aircraft system (UAS), e.g., a tethered UAS, a lighter than air UAS (LTA), a heavier than air UAS (HTA) and a high altitude UAS platforms (HAPs), or any transmission/reception point, TRP, enabling an item or a device to communicate using the wireless communication network, the item or device being provided with network connectivity to communicate using the wireless communication network.

Although some aspects of the described concept have been described in the context of a system, it is clear that these aspects also represent a description of the corresponding method, where a block or a device corresponds to a method step or a feature of a method step. Analogously, aspects described in the context of a method step also represent a description of a corresponding block or item or feature of a corresponding apparatus. In addition, the above explained solution using the blacklist is also applicable for other cases, for example, in case the occurrence of the in-line interference between the moving transmission points, or between the terrestrial transmission point and the non-terrestrial transmission point, or between the stationary transmission point and the non-stationary transmission point.

Figure 15:
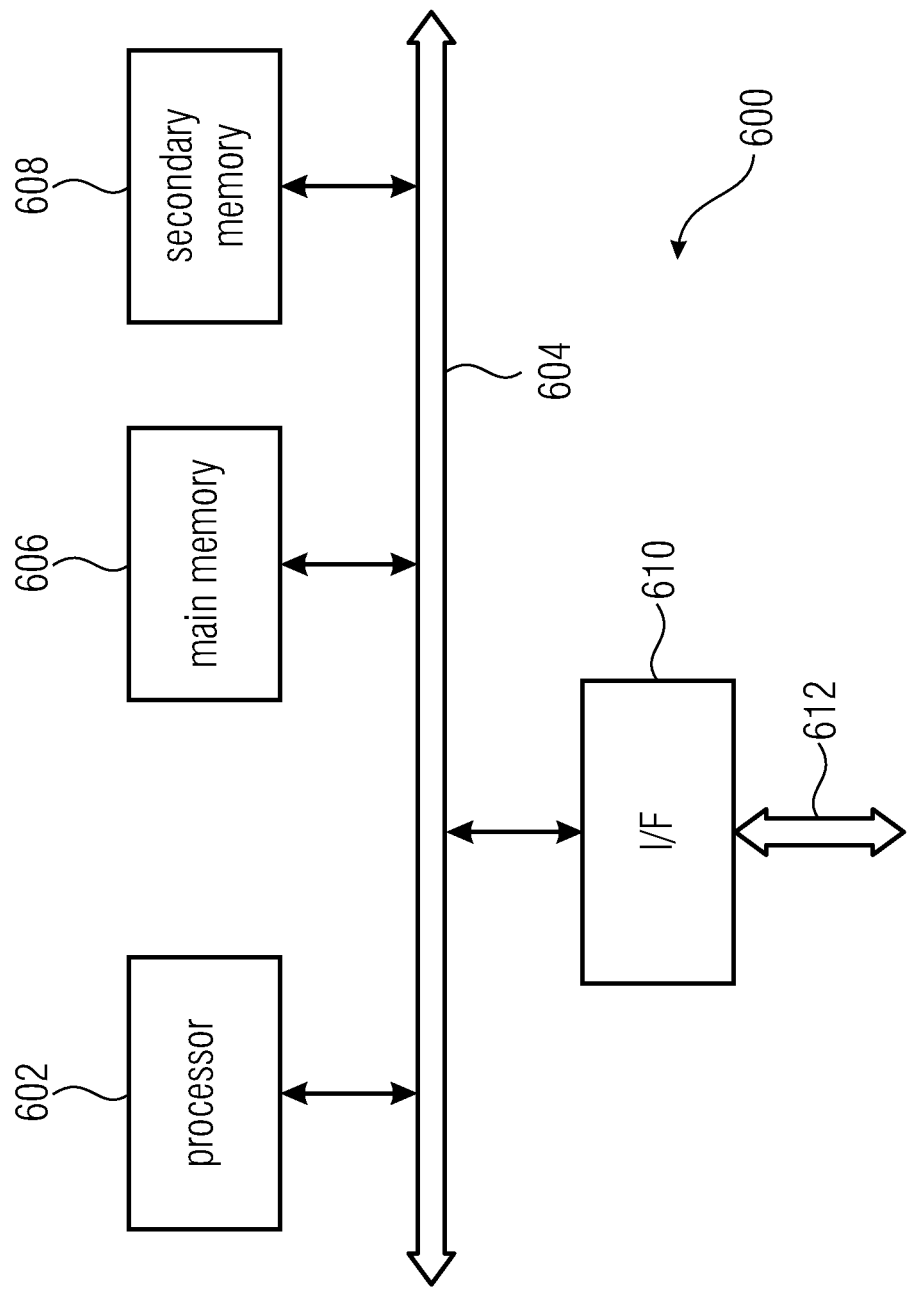
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. The figure below illustrates an example of a computer system 600 as shown in FIG. 15.

The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for determining a position of a user device, UE, in a wireless communication system, the wireless communication system comprising one or more moving transmission reception points, TRPs, the apparatus comprising:
   a communication interface;
   one or more memories storing instructions; and
   one or more processors, which are coupled to the communication interface and the one or more memories, to execute the instructions stored in the one or more memories to implement operations comprising:
   initiating one or more procedures to perform one or more measurements between the UE and one of the moving TRPs, and acquiring one or more measurement results; and
   receiving at least one message from the one moving TRP, comprising a position information of the one moving TRP,
   wherein the position information comprises a position of the one moving TRP and a time the one moving TRP or the UE performed the one or more measurements,
   wherein the apparatus is capable of determining the position of the UE, using the one or more measurement results, the position of the one moving TRP, and the time the one moving TRP or the UE performed the one or more measurements,
   wherein the operations further comprise acquiring a position time record, and
   wherein the position time record provides the apparatus with a position history for the one moving TRP by providing the position of the one moving TRP and a time corresponding to the position of the one moving TRP, or a position displacement from an initial position of the one moving TRP.

2. The apparatus according to claim 1, wherein the operations further comprise:
   sending a request to the one moving TRP and/or the UE to perform a measurement of a signal transmission between the UE and the one moving TRP, and
   acquiring from the one moving TRP and/or the UE a measurement result of the measurement of the signal transmission between the UE and the one moving TRP.

3. The apparatus according to claim 2, wherein:
   the request is an Uplink and/or a Downlink procedure,
   the operations further comprise:
      performing the one or more measurements between the UE and the one moving TRP from one Uplink reference signal transmitted and/or one Downlink reference signal transmitted from the UE and the one moving TRP;
      receiving a first message comprising the one or more measurement results from the one moving TRP; wherein the first message comprises time information of the transmitted Downlink reference signal and/or the one or more measurement results from the Uplink reference signal; and/or
      receiving a second message comprising the one or more measurement results from the UE; wherein the second message comprises time information of the transmitted Uplink reference signal and/or the one or more measurement results from the Downlink reference signal; and
      receiving a third message from the one moving TRP, comprising the position information of the one moving TRP;
   the apparatus is capable of estimating the position of the UE using the information in the third message and either one or both of the first and second messages.

4. The apparatus according to claim 1, wherein the operations further comprise sending the request on-demand by another network entity, or periodically with a configured or preconfigured periodicity.

5. The apparatus according to claim 1, wherein:
   the one or more procedures perform a set of subsequent measurements from the one or more moving TRPs so as to acquire a set of subsequent measurement results,
   the at least one message from the moving TRP comprises the position information of the one moving TRP at an initial measurement,
   the operations further comprise determining the position information of the one moving TRP at a further measurement using a trajectory of the one moving TRP.

6. The apparatus according to claim 5, wherein:
   the further measurement is a round trip time measurement, RTT,
   the position of the moving TRP is different at a time of transmission of a measurement signal from a time of reception of a measurement signal of the further measurement, and
   the operations further comprise estimating the position of the UE by solving a positioning equation in least square sense using the trajectory of the one moving TRP for calculating pseudoranges between the UE and each of the position of the one moving TRP where the RTT measurement is made.

7. The apparatus according to claim 1, wherein the acquired position information comprises one of a quality of the one moving TRP position or a source of the position of the one moving TRP.

8. The apparatus according to claim 1, wherein the operations further comprise initiating the one or more measurements between the UE and more than one of the one or more moving TRPs.

9. The apparatus according to claim 1, wherein the apparatus performs a location management function.

10. The wireless communication system according to claim 1, wherein the apparatus determines the position of the UE without using a Global Navigation Satellite System of the UE.

11. A moving transmission reception point, TRP, for performing one or more measurements between a user device, UE, and the moving TRP, in a wireless communication system, the moving TRP comprising:
   a communication interface;
   one or more memories storing instructions, and
   one or more processors, which are coupled to the communication interface and the one or more memories, to execute the instructions stored in the one or more memories to implement operations comprising:
      performing a measurement of a signal transmission between the UE and the moving TRP, acquiring (a) a moving TRP position information element, IE, indicating a position of the moving TRP at a time of the measurement, or (b) the moving TRP position IE and the time of the measurement, and sending the moving TRP position IE and/or the time of the measurement, wherein the operations further comprise providing a position time record to an apparatus for determining a position of a user device, UE, in the wireless communication system, and wherein the position time record provides the apparatus with a position history for the one moving TRP by providing the position of the one moving TRP and a time corresponding to the position of the one moving TRP, or a position displacement from an initial position of the one moving TRP.

12. A wireless communication system comprising
one or more user devices, UEs;
one or more moving transmission reception points, TRPs, for performing one or more measurements between a UE of the one or more UEs, and one of the one or more moving TRPs, in the wireless communication system, wherein the one moving TRP comprises:
a TRP communication interface;
one or more TRP memories storing instructions, and
one or more TRP processors, which are coupled to the TRP communication interface and the one or more TRP memories, to execute the instructions stored in the one or more TRP memories to implement operations comprising:
performing a measurement of a signal transmission between the UE and the one moving TRP,
acquiring (a) a moving TRP position information element, IE, indicating a position of the one moving TRP at a time of the measurement, or (b) the moving TRP position IE and the time of the measurement, and
sending the moving TRP position IE and/or the time of the measurement; and
an apparatus for determining a position of the UE in the wireless communication system, wherein the apparatus comprises:
an apparatus communication interface;
one or more apparatus memories storing instructions, and
one or more apparatus processors, which are coupled to the apparatus communication interface and the one or more apparatus memories, to execute the instructions stored in the one or more apparatus memories to implement operations comprising:
initiating one or more procedures to perform one or more measurements between the UE and the one moving TRP, and acquiring one or more measurement results; and
receiving at least one message from the one moving TRP comprising a position information of the one moving TRP;
wherein the position information comprises a position of the one moving TRP and a time the one moving TRP or the UE performed the one or more measurements;
wherein the apparatus is capable of determining the position of the UE, using the one or more measurement results, the position of the one moving TRP, and the time the moving TRP or the UE performed the one or more measurements,
wherein the operations further comprise acquiring a position time record, and
wherein the position time record provides the apparatus with a position history for the one moving TRP by providing the position of the one moving TRP and a time corresponding to the position of the one moving TRP, or a position displacement from an initial position of the one moving TRP.

13. The wireless communication system according to claim 12, wherein the wireless communication system comprises
a terrestrial network, or
a non-terrestrial network, or
networks or segments of networks using as a terminal an airborne vehicle or a spaceborne vehicle, or
a combination thereof,
wherein the UE is one or more of
a mobile terminal, or
a stationary terminal, or
a cellular IoT-UE, or
a vehicular UE, or
an IoT or narrowband IoT, NB-IoT, device, or
a ground based vehicle, or
an aerial vehicle, or
a drone, or
a moving base station, or
a road side unit, or
any other item or device provided with network connectivity enabling the item/device to communicate using the wireless communication network, and
wherein the transmission reception point comprises one or more of
a macro cell base station, or
a small cell base station, or
a central unit of a base station, or
a distributed unit of a base station, or
a road side unit, or
a UE, or
a remote radio head, or
a spaceborne vehicle, or
an airborne vehicle, or
any transmission/reception point, TRP, enabling an item or a device to communicate using the wireless communication network, the item or device being provided with network connectivity to communicate using the wireless communication network.

14. The wireless communication system according to claim 13, wherein the any other item or device provided with network connectivity enabling the item/device to communicate using the wireless communication comprises one of a sensor or actuator.

15. The wireless communication system according to claim 13, wherein:
the spaceborne vehicle is a satellite or a space vehicle at a specific altitude and orbital period or plane including one of a low earth orbit (LEO), a medium earth orbit (MEO), a geosynchronous orbit (GSO), a geostationary orbit (GEO), or a high earth orbit (HEO).

16. The wireless communication system according to claim 13, wherein the airborne vehicle is an unmanned aircraft system (UAS) including one of a tethered UAS, a lighter than air UAS (LTA), a heavier than air UAS (HTA) and a high altitude UAS platforms (HAPs).

17. A user device, UE, for performing one or more measurements between one moving transmission reception point, TRP, and the UE, in a wireless communication system, the UE comprising:
a communication interface;
one or more memories storing instructions; and
one or more processors, which are coupled to the communication interface and the one or more memories, to execute the instructions stored in the one or more memories to implement operations comprising:
performing a predetermined number of measurements of a signal transmission between the moving TRP and the UE, wherein multiple round-trip time, RTT, measurements are performed as the predetermined number of measurements at different times;
acquiring results of the predetermined number of measurements and the different times that the respective predetermined number of measurements are performed,
determining a variation in a downlink delay due to movement of the moving TRP, wherein the variation is determined based on the results of the predetermined number of measurements and the different times that the respective predetermined number of measurements are performed, and
sending the results and the different times of the predetermined number of measurements as well as the variation in the downlink delay to an apparatus for determining a position of the UE in the wireless communication system.

18. A method for determining a position of a user device, UE, in a wireless communication system, the wireless communication system comprising an apparatus and one or more moving transmission reception points, TRPs, the method comprising:
initiating one or more procedures to perform one or more measurements between the UE and one of the one or more moving TRPs and acquiring one or more measurement results; and
receiving at least one message from the one moving TRP comprising a position information of the one moving TRP;
wherein the position information comprises a position of the one moving TRP, and a time the one moving TRP or the UE performed the one or more measurements;
wherein the apparatus is capable of determining the position of the UE using the one or more measurement results, the position of the one moving TRP, and the time the one moving TRP or the UE performed the one or more measurements,
wherein the method further comprises acquiring a position time record, and
wherein the position time record provides the apparatus with a position history for the one moving TRP by providing the position of the one moving TRP and a time corresponding to the position of the one moving TRP, or a position displacement from an initial position of the one moving TRP.

19. A non-transitory computer readable medium storing a program code including instructions that, when executed by at least one processor of a computing device, cause the computing device to perform a method for determining a position of a user device, UE, in a wireless communication system, the wireless communication system comprising one or more moving transmission reception points, TRPs, wherein the method comprises operations comprising:
initiating one or more procedures to perform one or more measurements between the UE and one of the one or more moving TRPs and acquiring one or more measurement results; and
receiving at least one message from the one moving TRP comprising a position information of the one moving TRP;
wherein the position information comprises a position of the one moving TRP, and a time the one moving TRP or the UE performed the one or more measurements;
wherein the apparatus is capable of determining the position of the UE using the one or more measurement results, the position of the one moving TRP, and the time the one moving TRP or the UE performed the one or more measurements,
wherein the operations further comprise acquiring a position time record, and
wherein the position time record provides the apparatus with a position history for the one moving TRP by providing the position of the one moving TRP and a time corresponding to the position of the one moving TRP, or a position displacement from an initial position of the one moving TRP.

\* \* \* \* \*